US008883880B2

(12) United States Patent
Luckenbach et al.

(10) Patent No.: US 8,883,880 B2
(45) Date of Patent: Nov. 11, 2014

(54) SOLUBLE SHELL POLYMER COMPOSITION AND METHOD FOR ITS PREPARATION

(75) Inventors: Monica Luckenbach, Woxall, PA (US); Ozzie M. Pressley, Cheltenham, PA (US); Wei Zhang, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 61 days.

(21) Appl. No.: 13/597,335

(22) Filed: Aug. 29, 2012

(65) Prior Publication Data

US 2013/0066005 A1 Mar. 14, 2013

Related U.S. Application Data

(60) Provisional application No. 61/532,142, filed on Sep. 8, 2011.

(51) Int. Cl.
| | |
|---|---|
| C08F 265/06 | (2006.01) |
| C08K 5/42 | (2006.01) |
| C08F 230/02 | (2006.01) |
| C09D 151/06 | (2006.01) |
| C09D 151/00 | (2006.01) |
| C08L 51/00 | (2006.01) |

(52) U.S. Cl.
CPC ............. *C08F 265/06* (2013.01); *C08F 230/02* (2013.01); *C09D 151/06* (2013.01)
USPC ............................ 523/201; 524/460; 524/747

(58) Field of Classification Search
None
See application file for complete search history.

(56) References Cited

U.S. PATENT DOCUMENTS

| | | | |
|---|---|---|---|
| 4,916,171 A | 4/1990 | Brown et al. | |
| 6,576,051 B2 * | 6/2003 | Bardman et al. | 106/436 |
| 7,537,802 B2 * | 5/2009 | Rosano | 427/180 |
| 7,705,082 B2 | 4/2010 | Porzio et al. | |
| 2003/0018103 A1 | 1/2003 | Bardman et al. | |
| 2011/0244134 A1 | 10/2011 | Dowbrowski et al. | |

FOREIGN PATENT DOCUMENTS

| | | | |
|---|---|---|---|
| DE | 10161273 A1 * | 6/2003 | |
| EP | 1398333 A1 | 3/2004 | |
| EP | 1433797 A1 | 6/2004 | |

OTHER PUBLICATIONS

Machine Translation of DE 10161273 A1. Jun. 23, 2003.*
Texanol Product Data Sheet. Eastman Chemical. Jul. 10, 2013.*
Acrysol RM-2020 Product Data Sheet. Dow Chemical. Dec. 2007.*
Acrysol RM-8W Product Data Sheet. Dow Chemical. Dec. 2007.*
Lacquers Information. HighBeam Business. http://business.highbeam.com/665/article-1G1-79127644/finishing. As viewed on Jan. 29, 2014.*

* cited by examiner

*Primary Examiner* — Robert C Boyle
*Assistant Examiner* — Stephen Rieth
(74) *Attorney, Agent, or Firm* — Reid S. Willis

(57) ABSTRACT

The present invention relates to a soluble shell polymer composition comprising an alkali soluble emulsion polymer shell and an alkali insoluble emulsion polymer core, which composition is stabilized by a surfactant of the formula $R-(OCH_2CH_2)_{2-6}OSO_3^- M^+$, where R is a linear, branched, or cyclic $C_8$-$C_{24}$ alkyl or $C_{12}$-$C_{18}$ aralkyl group and $M^+$ is a counterion. The invention further relates to a method of preparing the composition and its use as a binder in coatings formulations. Formulations prepared with the soluble shell polymer composition have excellent freeze-thaw profiles and hiding.

10 Claims, No Drawings

SOLUBLE SHELL POLYMER COMPOSITION AND METHOD FOR ITS PREPARATION

BACKGROUND OF THE INVENTION

Latex coating compositions include a variety of additives to improve performance. For example, anti-freeze additives such as ethylene glycol and propylene glycol are used to prevent the composition from freezing and to improve composition performance at low temperatures. Coalescing solvents are also used to lower minimum film-forming temperature. Nevertheless, the use of these additives have become less desirable due to regulatory pressures toward reducing or even eliminating the addition of organic compounds having atmospheric boiling points up to 260° C. (i.e., VOCs) in formulations. In one approach for addressing this problem, U.S. Pat. No. 7,705,082 discloses the addition of a low volatile oligomeric ethylene glycol derivative to produce a coating formulation with acceptable freeze-thaw properties. However, the disclosed method requires substantial amounts of the additive, adding cost and complexity, as well as potentially increased water sensitivity and foaming, to the formulation. It would therefore be desirable to find other approaches to achieving acceptable freeze-thaw properties without the use of VOCs.

SUMMARY OF THE INVENTION

The present invention provides, in a first aspect, a soluble shell polymer composition comprising from 5 to 20 weight percent of an alkali soluble emulsion polymer shell and from 80 to 95 weight percent of an alkali insoluble emulsion polymer core, wherein:

the alkali soluble emulsion polymer shell comprises from 75 to 95 weight percent structural units of an acrylic monomer and from 5 to 25 weight percent structural units an acrylic acid monomer, based on the weight of the alkali soluble emulsion polymer; and wherein:

the alkali insoluble emulsion polymer core comprises from 0.1 to 5 weight percent structural units of a phosphorus acid monomer and from 80 to 99.9 weight percent structural units of an acrylic monomer, based on the weight of the alkali insoluble emulsion polymer; wherein the soluble shell polymer composition is stabilized by 0.5 to 5 weight percent, based on the weight of the soluble shell polymer composition, of a surfactant of the formula R—(OCH$_2$CH$_2$)$_{2-6}$OSO$_3$$^-$M$^+$, where R is a linear, branched, or cyclic C$_8$-C$_{24}$ alkyl or C$_{12}$-C$_{30}$ aralkyl group and M$^+$ is a counterion.

In a second aspect, the present invention is a method comprising the steps of: a) contacting together under emulsion polymerization conditions an acrylic monomer an acrylic acid monomer to form an alkali soluble polymer; and b) contacting the alkali soluble polymer with an acrylic monomer and a phosphorus acid monomer under emulsion polymerization conditions and in the presence of a surfactant of the formula R—(OCH$_2$)$_{2-6}$OSO$_3$$^-$M$^+$ to form an acrylic latex polymer with an alkali soluble portion and an alkali insoluble portion, wherein R is a linear, branched, or cyclic C$_8$-C$_{24}$ alkyl or C$_{12}$-C$_{30}$ aralkyl group; and M$^+$ is a counterion.

The composition of the present invention can be used in a coatings formulation to give desirable freeze-thaw and hiding properties without the use of either VOCs or external additives that adversely affect other properties of the formulation.

DETAILED DESCRIPTION OF THE INVENTION

In a first aspect, the present invention provides a soluble shell polymer composition comprising from 5 to 20 weight percent of an alkali soluble emulsion polymer shell and from 80 to 95 weight percent of an alkali insoluble emulsion polymer core, wherein:

the alkali soluble emulsion polymer shell comprises from 75 to 95 weight percent structural units of an acrylic monomer and from 5 to 25 weight percent structural units an acrylic acid monomer, based on the weight of the alkali soluble emulsion polymer; and wherein:

the alkali insoluble emulsion polymer core comprises from 0.1 to 5 weight percent structural units of a phosphorus acid monomer and from 80 to 99.9 weight percent structural units of an acrylic monomer, based on the weight of the alkali insoluble emulsion polymer; wherein the soluble shell polymer composition is stabilized by 0.5 to 5 weight percent, based on the weight of the soluble shell polymer composition, of a surfactant of the formula R—(OCH$_2$CH$_2$)$_{2-6}$OSO$_3$$^-$M$^+$, where R is a linear, branched, or cyclic C$_8$-C$_{24}$ alkyl or C$_{12}$-C$_{18}$ aralkyl group and M$^+$ is a counterion.

As used herein, the term "structural units" of the named monomer or class, refers to the remnant of the monomer after polymerization. A structural unit of methyl methacrylate is illustrated:

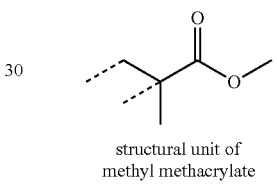

structural unit of
methyl methacrylate where the dotted lines represent the points of attachment of the structural unit to the polymer backbone.

Examples of suitable acrylic monomers used in the preparation of the alkali soluble polymer emulsion shell and alkali insoluble polymer emulsion core include acrylates and methacrylates such as methyl methacrylate, ethyl methacrylate, ethyl acrylate, butyl acrylate, butyl methacrylate, ethyl hexyl acrylate and combinations thereof. Preferred combinations of acrylic monomers include of methyl methacrylate and one or more monomers selected from ethyl acrylate, butyl acrylate, and 2-ethylhexyl acrylate. More preferred combinations of acrylic monomers include methyl methacrylate and butyl acrylate; methyl methacrylate and ethylhexyl acrylate; and methyl methacrylate, butyl acrylate, and ethyl acrylate.

Examples of suitable acrylic acid monomers used in the preparation of the alkali soluble polymer shell include methacrylic acid, acrylic acid, and itaconic acid, with methacrylic acid being preferred.

Examples of suitable phosphorus acid monomers used in the preparation of the alkali insoluble polymer core include phosphonates and dihydrogen phosphate esters of an alcohol in which the alcohol contains or is substituted with a polymerizable vinyl or olefinic group. Preferred structural units of dihydrogen phosphate esters are structural units of phosphates of hydroxyalkylmethacrylates, including structural units of phosphoethyl methacrylate and phosphopropyl methacrylates, with structural units of phosphoethyl methacrylate being especially preferred. "Phosphoethyl methacrylate" (PEM) is used herein to refer to the following structure:

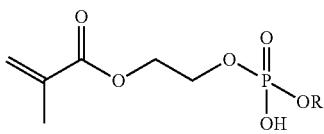

where R is H or

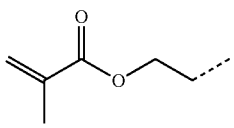

Preferably, the alkali soluble emulsion polymer shell comprises from 85 to 95 weight percent structural units of the acrylic monomer and from 5 to 15 weight percent structural units of the acrylic acid monomer, based on the weight of the alkali soluble polymer.

The alkali insoluble emulsion polymer core preferably comprises from 0.5 to 3 weight percent structural units of a phosphorus acid monomer and from 85 to 95 weight percent structural units of an acrylic monomer, based on the weight of the alkali insoluble emulsion polymer.

The alkali soluble emulsion polymer shell and alkali insoluble emulsion polymer core may include structural units of other monomers such as sulfur acid functional monomers, including sulfoethyl methacrylate, sulfopropyl methacrylate, styrene sulfonic acid, vinyl sulfonic acid, and 2-methacrylamido-2-methyl propanesulfonic acid, and salts thereof; styrene monomers such as styrene and vinyl toluenes; multiethylenically unsaturated monomers such as allyl methacrylate; vinyl esters such as vinyl acetate; and multifunctional monomers such as ureido methacrylate and acetoacetoxyethyl methacrylate.

The soluble shell polymer composition is advantageously prepared in multiple stages. In a first stage, an acrylic monomer and an acrylic acid monomer are advantageously contacted together under emulsion polymerization conditions.

In a second stage, the alkali soluble polymer is advantageously contacted with an acrylic monomer and a phosphorous acid monomer under emulsion polymerization conditions to form an acrylic latex polymer (i.e., a soluble shell polymer) with an alkali soluble shell and an alkali insoluble core.

Either or both of the first and second stages of polymerization are carried out in the presence of emulsifier R—(OCH$_2$CH$_2$)$_{2-6}$OSO$_3^-$M$^+$, where R and M$^+$ are as previously defined. It is preferred that this surfactant is used at least in the second stage; it is more preferred that this surfactant is used in both stages and predominantly in the second stage of the reaction. The concentration of the emulsifier is preferably from 1 to 3 weight percent, based on the weight of the soluble shell polymer.

Preferably, R is a C$_{10}$-C$_{18}$-linear or branched alkyl group; and M$^+$ is preferably Na$^+$, K$^+$, or NH$_4^+$. An example of a commercially available surfactant is Disponil FES 32 emulsifier, which is nominally n-dodecyl-(OCH$_2$CH$_2$)$_4$—OSO$_3^-$ Na$^+$. The number of ethylene oxide groups in this surfactant actually covers predominantly from 2 to 6 ethylene oxide groups.

The soluble shell polymer composition may be the product of additional stages of polymerization, for example, by contacting under emulsion polymerization conditions the 2-stage soluble shell polymer with an acrylate or methacrylate, such as those described herein.

The soluble shell polymer composition can be used as a binder for aqueous coatings compositions, which may include one or more of the following additives: Solvents; fillers; rheology modifiers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated opacifying pigment particles including titanium dioxide, zinc oxide, or lithopone polymers; polymers or polymer emulsions adsorbing or bonding to the surface of pigments such as titanium dioxide; hollow pigments, including pigments having one or more voids; dispersants, such as aminoalcohols and polycarboxylates; additional surfactants; defoamers; preservatives, such as biocides, mildewcides, fungicides, algaecides, and combinations thereof; flow agents; leveling agents; and neutralizing agents, such as hydroxides, amines, ammonia, and carbonates.

A preferred coatings composition contains less than 1000 ppm of VOCs or any additional compounds that improve freeze-thaw stability of the composition. As the following example and comparative examples demonstrate, coatings compositions that use the soluble shell polymer composition of the present invention give excellent freeze-thaw stability without the use of VOCs or other additives that promote freeze-thaw stability.

The following examples are for illustrative purposes only and are not intended to limit the scope of the invention.

EXAMPLE 1

Preparation of Soluble Shell Polymer Binder using Disponil FES-32 as Surfactant

A first monomer emulsion (ME1) was prepared by mixing in a vessel deionized water (100 g), Disponil FES-32 emulsifier (5.20 g, 30% active), butyl acrylate (36 g), methyl methacrylate (143.9 g), methacrylic acid (20 g), styrene (0.1 g), and methyl mercaptoproprionate chain transfer agent (10.2 g). A second monomer emulsion (ME2) was prepared by mixing in a separate vessel deionized water (495 g), Disponil FES-32 surfactant (79.9 g, 30% active), butyl acrylate (468 g), ethyl acrylate (540 g), methyl methacrylate (702 g), phosphoethyl methacrylate (36 g, 65% active), acetoacetyloxyethyl methacrylate (36 g), and ureido methacrylate (36 g, 50% active).

To a 5-L, four necked round bottom flask equipped with a paddle stirrer, a thermometer, nitrogen inlet, and a reflux condenser was added deionized water (700 g) and Disponil FES-32 surfactant (13.4 g, 30% active). The contents of the flask were heated with stirring to 86° C. under a nitrogen atmosphere. A buffer solution of sodium carbonate (2.1 g) dissolved in deionized water (25 g) was added to the flask. A portion of ME1 (81 g) was then added followed by a solution of ammonium persulfate (4 g) in deionized water (27 g). After the reaction temperature peaked, a mixture made from a solution of ferrous sulfate heptahydrate in water (19.8 g, 0.15% w/w) and a solution of ethylenediaminetetraacetic acid tetrasodium salt in water (2.9 g, 1% w/w) was added. Two co-feed solutions were then fed to the flask over a period of 85 min: The first co-feed solution was made from t-amyl hydroperoxide (4.0 g, 85% active), Disponil FES-32 surfactant (1.2 g, 30% active), and deionized water (95 g), and the second co-feed solution was made from isoascorbic acid (3.08 g) and deionized water (100 g). After 2 min of the onset of co-feeding, the remaining ME1 was fed to the flask over 15 min while maintaining the temperature at 86° C.

Once the ME1 feed was complete, the vessel containing residual ME1 was rinsed with deionized water, and the rinse added to the flask. The contents of the flask were held at 86° C. for 20 min, after which time the addition of co-feeds were stopped for 20 min. Addition of co-feeds was resumed, at which time ME2 was fed to the flask over 65 min. After 34% of ME2 was added, ammonium hydroxide solution (11.3 g 28% ammonia) was added to the second co-feed solution.

Following the completion of the addition of ME2, the vessel containing residual ME2 was rinsed with deionized water, and the rinse added to the flask. The contents of the flask were held at 86° C. for 15 min, after which time, the contents of the flask were cooled to 60° C.; a solution of t-butyl hydroperoxide (70% active, 1.0 g) in deionized water (30.0 g) and a solution of isoascorbic acid (1.0 g) in deionized water (30.0 g) were then fed into the reactor over a period of 45 min to reduce residual monomer. The polymer was then neutralized to pH 7.7 with aqueous $NH_4OH$. The measured particle size was 137 nm and the solids were 50.3%.

COMPARATIVE EXAMPLE 1

Preparation of Soluble Shell Polymer Binder using Disponil FES-993 Surfactant

The procedure of Example 1 was followed except that Disponil FES-993 surfactant (nominally sodium dodecyl-$(OCH_2)_{11}OSO_3^-Na^+$, and predominantly sodium dodecyl-$(OCH_2)_{8-12}OSO_3^-Na^+$ was used as the emulsifier.

COMPARATIVE EXAMPLE 2

Preparation of Soluble Shell Polymer Binder using Soprophor 4D384 Surfactant

The procedure of Example 1 was followed except that Soprophor 4D384 surfactant (illustrated) was used as an emulsifier.

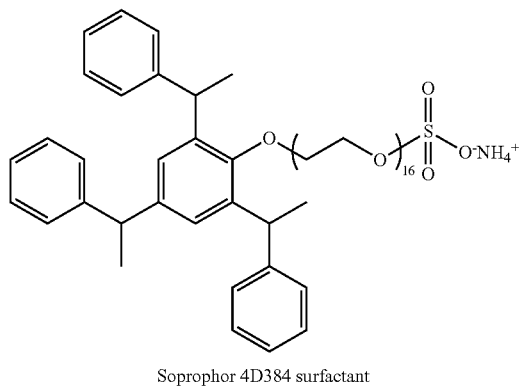

Soprophor 4D384 surfactant

COMPARATIVE EXAMPLE 3

Preparation of a Non-Soluble Shell Phosphoethyl Methacrylate Binder

A first monomer emulsion (ME1) was prepared by mixing deionized water (545 g), Disponil FES-993 surfactant (82.5 g, 30% active), butyl acrylate (456 g), ethyl acrylate (570 g), methyl methacrylate (802.75 g), phosphoethyl methacrylate (38 g, 65% active), methacrylic acid (4.75 g), ureido methacrylate (57 g, 50% active), and n-dodecylmercaptan (2.38 g). A second monomer emulsion (ME2) was prepared by mixing deionized water (25 g), Disponil FES-993 surfactant (30% active, 2.6 g), butyl acrylate (20 g), and methyl methacrylate (80 g).

To a 5-liter, 4-necked round bottom flask equipped with a paddle stirrer, a thermometer, a nitrogen inlet, and a reflux condenser was added deionized water (700 g) and (30% active, 13.4 g) Disponil FES-993 surfactant. The contents of the flask were heated with stirring to 86° C. under a nitrogen atmosphere. A buffered solution of ammonium bicarbonate (3.2 g) dissolved in deionized water (25 g) was added to the flask. A portion of ME1 (81 g) was then added, followed by addition of a solution of ammonium persulfate (4 g) dissolved in deionized water (27 g). After the reaction temperature peaked, a mixture made from a solution of 0.15% ferrous sulfate heptahydrate in water (19.8 g) and a 1% solution of ethylenediaminetetraacetic acid tetrasodium salt in water (2.9 g) was added. Two co-feed solutions were then fed to the flask over a period of 85 min: the first co-feed solution was made from t-amyl hydroperoxide (85% active, 4.0 g), Disponil FES-993 surfactant (1.2 g), and deionized water (95 g), and the second co-feed solution was made from isoascorbic acid (3.08 g) and deionized water (100 g). After 2 min of the onset of co-feeding, the remaining ME1 was fed to the flask over 80 min while maintaining the temperature at 86° C.

Once the ME1 feed was complete, the vessel containing residual ME1 was rinsed with deionized water, and the rinse added to the flask. The contents of the flask were held at 86° C. for 15 min, after which time the contents of the flask were cooled to 60° C. ME2 was then added to the flask over 5 min. The vessel containing residual ME2 was rinsed with deionized water, and the rinse added to the flask, followed by addition of t-butyl hydroperoxide (70% active, 0.5 g) in deionized water (8 g), then a solution of isoascorbic acid (0.4 g) in deionized water (12 g). A solution of t-butyl hydroperoxide (70% active, 1.0 g) in deionized water (30.0 g) and a solution of isoascorbic acid (1.0 g) in deionized water (30.0 g) were then fed into the reactor over a period of 45 min to reduce residual monomer, and the polymer was then neutralized to pH 8.0 with aqueous $NH_4OH$. The measured particle size was 110 nm and the solids were 49.5%.

COMPARATIVE EXAMPLE 4

Preparation of a Soluble Shell Non-PEM Binder

A first monomer emulsion (ME1) was prepared by mixing in a vessel deionized water (100 g), Disponil FES-32 emulsifier (5.20 g, 30% active), butyl acrylate (36 g), methyl methacrylate (143.9 g), methacrylic acid (20 g), styrene (0.1 g), and methyl mercaptoprorionate chain transfer agent (10.2 g). A second monomer emulsion (ME2) was prepared by mixing in a separate vessel deionized water (495 g), Disponil FES-32 surfactant (79.9 g, 31% active), butyl acrylate (468 g), ethyl acrylate (540 g), methyl methacrylate (720 g), methacrylic acid (18 g), acetoacetyloxyethyl methacrylate (36 g), and ureido methacrylate (36 g, 50% active).

To a 5-L, four necked round bottom flask equipped with a paddle stirrer, a thermometer, nitrogen inlet, and a reflux condenser was added deionized water (700 g) and Disponil FES-32 surfactant (13.4 g, 31% active). The contents of the flask were heated with stirring to 86° C. under a nitrogen atmosphere. A buffer solution of sodium carbonate (2.1 g dissolved in deionized water (25 g) was added to the flask. A portion of ME1 (81 g) was then added followed by a solution of ammonium persulfate (4 g) in deionized water (27 g). After the reaction temperature peaked, a mixture made from a solution of ferrous sulfate heptahydrate in water (19.8 g, 0.15% w/w) and a solution of ethylenediaminetetraacetic acid tetrasodium salt in water (2.9 g, 1% w/w) was added. Two co-feed solutions were then fed to the flask over a period of 85 min: The first co-feed solution was made from t-amyl hydroperoxide (4.0 g, 85% active), Disponil FES-32 surfactant (1.2 g, 30% active), and deionized water (95 g), and the second co-feed solution was made from isoascorbic acid (3.08 g) and deionized water (100 g). After 2 min of the onset of co-feeding, the remaining ME1 was fed to the flask over 15 min while maintaining the temperature at 86° C.

Once ME1 feed was complete, the vessel containing ME1 was rinsed with deionized water, and the rinse added to the flask. The contents of the flask were held at 86° C. for 20 min, at which time the addition of co-feeds were stopped for 20 min. Addition of co-feeds was resumed, at which time ME2 was fed to the flask over 65 min. After 34% of ME2 was added, a solution of KOH (45% active, 23.5 g) in deionized water (50 g) was added to the remaining ME 2. Following the completion of the addition of ME2, the vessel containing the emulsion was rinsed with deionized water, and the rinse added to the flask; the contents of the flask were then held at 86° C. for 15 min. After the 15 minute hold, the contents of the flask were cooled to 60° C. and a solution of t-butyl hydroperoxide (70% active, 1.0 g) in deionized water (30.0 g) and a solution of isoascorbic acid (1.0 g) in deionized water (30.0 g) were fed into the reactor over a period of 45 min to reduce residual monomer. The polymer was then neutralized to pH 8.2 with aqueous NH$_4$OH. The measured particle size was 132 nm and the solids were 50.3%.

Paint formulations (Example 1a and Comparative Examples 1a-4a) were prepared as shown in Table 1 by adding the components to a container in the order listed. The amounts used were the same for formulations prepared using the binder from Example 1 and each Comparative Examples 1-4 except where indicated. PVC refers to pigment volume concentration. TSSP refers to tetrasodium pyrophosphate; SHMP refers to sodium hexametaphosphate; RM-5000 refers to ACRYSOL™ RM-5000 Rheology Modifier; Ultra E refers to ROPAQUE™ Ultra E Opaque Polymer; RM-895 refers to ACRYSOL™ RM-895 Rheology Modifier; Dispersant refers to TAMOL™ 2002 Dispersant (ROPAQUE, TAMOL and ACRYSOL are trademarks of The Dow Chemical Company or its Affiliates); and Enhancer 400 refers to Optifilm Enhancer 400 plasticizer.

TABLE 1

Interior Semi-Gloss Paint Formulations

| Material Name | g | Level (%) | PVC |
|---|---|---|---|
| Grind | | | |
| Water | 50 | | |
| Foamstar A-34 Defoamer | 1.00 | | |
| Strodex TH-100 Surfactant | 2.47 | | |
| KOH (10%) | 10.00 | | |
| Dispersant | 6.07 | 1.00 | |
| TSSP | 0.75 | 0.29 | |
| SHMP | 0.75 | 0.29 | |
| Kronos 4311 TiO$_2$ | 296 | | 19.73 |
| Minex 10 extender | 25 | | 3.31 |
| Attagel 50 clay | 3 | | 0.44 |
| RM-5000 | 10 | | |

TABLE 1-continued

Interior Semi-Gloss Paint Formulations

| Material Name | g | Level (%) | PVC |
|---|---|---|---|
| Letdown | | | |
| Water | 50 | | |
| Example 1$^a$ | 414.47 | | |
| Foamstar A-34 defoamer | 2 | | |
| Enhancer 400 | 9.39 | 4 | |
| Add Grind Here | | | |
| Ultra E | 61.44 | | 10.52 |
| RM-5000 | 32 | | |
| RM-895$^a$ (Example 1) | 6.7 | | |
| Water$^a$ (Example 1) | 70.3 | | |

$^a$The amounts of the final water addition, binder, and ACRYSOL™ RM-895 Rheology Modifier used in the semi-gloss formulation are shown in Table 1a.

TABLE 1a

Amounts of Water, Binder and RM-895 Used for Formulations

| Binder Example # | Water (g) | Binder Amt. (g) | RM-895 (g) | Formulation Example |
|---|---|---|---|---|
| Ex. 1 | 70.30 | 414.47 | 6.7 | Ex. 1a |
| Comp. 1 | 56.47 | 425.90 | 9.1 | Comp. 1a |
| Comp. 2 | 50.72 | 431.85 | 8.9 | Comp. 2a |
| Comp. 3 | 60.91 | 425.06 | 5.5 | Comp. 3a |
| Comp. 4 | 54.83 | 430.14 | 6.5 | Comp. 4a |

The formulations were evaluated for Tint Strength by the following method, adapted from ASTM D 2745-89.

1. Each of the coatings being compared was tinted at a level of 2.00 oz/gallon or other desired level with the desired colorant.
2. The container was vibrated by hand to make certain that the colorant settled into the paint.
3. The sample was placed on a mechanical shaker for 5 min.
4. Thick (3 mil Bird Film Applicator or greater) drawdowns of the tinted paints were made and allowed to dry under controlled conditions (75° F./50% RH) for 1 day.
5. The Y-reflectance (R) was measured in 3 areas of the paint drawdown and the average number reported.

Tint strength (TS) was calculated as:

$$TS=((R_2)/(1-R_2)^2)\times((1-R_1)^2/(R_1))\times 100$$

where $R_1$ represents the standard and $R_2$ represents the tested paint. Results are shown in Table 2.

TABLE 2

Tint Strength of Coated Formulations

| | Formulation # | | | | |
|---|---|---|---|---|---|
| | Example 1a | Comp. 1a | Comp. 2a | Comp. 3a | Comp. 4a |
| EO range | 2-6 | 8-12 | 15-20 | 8-12 | 2-6 |
| Tint Strength | | | | | |
| Y-Reflectance | 67.14 | 66.34 | 65.53 | 67.01 | 64.44 |
| % v. Comp. 3a | 100.99 | 95.10 | 89.57 | 100.00 | 82.77 |
| % v. Comp. 4a | 122.02 | 114.90 | 108.22 | 120.82 | 100.00 |

The formulations were evaluated for freeze-thaw behavior by the following freeze/thaw test method: Samples were prepared by filling half-pint metal containers 75% full with the test formulation. The initial viscosity was measured in Krebs Units (KU) using a Brookfield KU-1 Viscometer. The containers were then sealed and placed into a 0° F. (~−18° C.) freezer for 16 h.

The containers were removed and allowed to thaw at ambient conditions for 8 h. The aqueous coatings were hand-sheared and the appearance rated on a scale of 1-5, with a 5 indicating that the coating was smooth and creamy, a 3 indicating that the coating was usable but no longer smooth and creamy, and a 1 indicating that the coating had solidified. Then the KU viscosity of the coating was measured and recorded. The freeze/thaw was repeated for three cycles. The results are shown in Table 3. $KU_o$ refers to the initial viscosity in Krebs units.

TABLE 3

Freeze-Thaw Cycles for Formulations

| | Example 1a | Comp. 1a | Comp. 2a | Comp. 3a | Comp. 4a |
|---|---|---|---|---|---|
| EO range Freeze/Thaw | 2-6 | 8-12 | 15-20 | 8-12 | 2-6 |
| $KU_o$ | 107 | 103 | 100 | 109 | 104 |
| Cycle 1 KU | 108 | 102 | 103 | Fail | 105 |
| Cycle 2 KU | 108 | 102 | 103 | | 104 |
| Cycle 3 KU | 108 | 101 | 103 | | 104 |
| Appearance | 5 | 5 | 5 | 1 | 5 |

The results from Tables 2 and 3 show the criticality of the combination of a phosphorous acid based soluble shell polymer binder and the range of EO groups in the alkyl or aralkyl ethoxylated sulfate surfactant used to stabilize the binder. Only the formulation of Example 1a exhibits both freeze-thaw stability and the preservation of hiding as compared to a formulation made without a soluble shell polymer (Comparative Example 3a). Thus, it has surprisingly been discovered that soluble shell polymers, which are generally observed to improve freeze-thaw stability in coatings formulations at the expense of reducing hiding (Comparative Examples 1a, 2a, and 4a), can be designed to produce formulations that exhibit freeze-thaw stability without sacrificing hiding.

The invention claimed is:

1. A soluble shell polymer composition comprising from 5 to 20 weight percent of an alkali soluble emulsion polymer shell and from 80 to 95 weight percent of an alkali insoluble emulsion polymer core, wherein:
the alkali soluble emulsion polymer shell comprises from 85 to 95 weight percent structural units of an acrylic monomer and from 5 to 15 weight percent structural units an acrylic acid monomer, based on the weight of the alkali soluble emulsion polymer; and wherein:
the alkali insoluble emulsion polymer core comprises from 0.1 to 5 weight percent structural units of a phosphorus acid monomer and from 80 to 99.9 weight percent structural units of an acrylic monomer, based on the weight of the alkali insoluble emulsion polymer; wherein the soluble shell polymer composition is stabilized by 0.5 to 5 weight percent, based on the weight of the soluble shell polymer, of a surfactant of the formula R—(OCH$_2$CH$_2$)$_{2-6}$OSO$_3^-$M$^+$, where R is a linear, branched, or cyclic C$_8$-C$_{24}$ alkyl or C$_{12}$-C$_{30}$ aralkyl group and M$^+$ is a counterion.

2. The composition of claim 1 wherein the structural units of the phosphorus acid monomer are structural units of phosphoethyl methacrylate.

3. The composition of claim 2 wherein the alkali insoluble emulsion polymer core comprises from 85 to 95 weight percent structural units of the acrylic monomer and from 0.5 to 3 weight percent of the phosphorus acid monomer, based on the weight of the alkali insoluble emulsion polymer.

4. The composition of claim 3 where R is a C$_{10}$-C$_{16}$ alkyl group; and wherein the structural units of the acrylic monomer for the alkali soluble and the alkali insoluble emulsion polymers are independently structural units of methyl methacrylate and of one or more monomers selected from the group consisting of ethyl acrylate, butyl acrylate, and 2-ethylhexyl acrylate.

5. The composition of claim 4 wherein the structural units of the acrylic monomer for the alkali soluble emulsion polymer are structural units of methyl methacrylate and butyl acrylate; the structural units of the acrylic acid monomer for the alkali soluble emulsion polymer are structural units of methacrylic acid; and the structural units of the acrylic monomer for the alkali insoluble emulsion polymer are structural units of methyl methacrylate, butyl acrylate, and ethyl acrylate.

6. A method of preparing the soluble shell polymer composition of claim 1 comprising the steps of: a) contacting together under emulsion polymerization conditions an acrylic monomer and an acrylic acid monomer to form an alkali soluble polymer; and b) contacting the alkali soluble polymer with an acrylic monomer and a phosphorus acid monomer under emulsion polymerization conditions to form an acrylic latex polymer with an alkali soluble shell and an alkali insoluble core; wherein the surfactant is a counterion, is added in either or both of the first or second stages.

7. The method of claim 6 wherein the acrylic monomers from steps a) and b) are methyl methacrylate and at least one acrylic monomer selected from the group consisting of ethyl acrylate, butyl acrylate, and 2-ethylhexyl acrylate; the acrylic acid monomer is methacrylic acid; and the phosphorus acid monomer is phosphoethyl methacrylate.

8. The method of claim 7 wherein the acrylic monomer from step a) is methyl methacrylate and butyl acrylate; and the acrylic monomer from step b) is methyl methacrylate, ethyl acrylate and butyl acrylate.

9. An aqueous coatings composition comprising the soluble shell polymer composition of claim 1, a rheology modifier, and titanium dioxide.

10. The aqueous coatings composition of claim 9 which contains less than 1000 ppm of volatile organic compounds.

* * * * *